Patented Jan. 19, 1932

1,841,840

UNITED STATES PATENT OFFICE

PAUL MÜLLER, OF NEU-ALLSCHWIL, NEAR BASEL, SWITZERLAND, ASSIGNOR TO THE FIRM: J. R. GEIGY S. A., OF BASEL, SWITZERLAND

MANUFACTURE OF TANNING SUBSTANCES

No Drawing. Application filed January 11, 1929, Serial No. 331,957, and in Germany January 28, 1928.

It has been found that substances with exceptional tanning properties are obtained if the products of reaction of concentrated sulphuric acid on phenols or phenol derivatives are condensed at elevated temperature in the presence of urea with formaldehyde in strong sulphuric acid solution. This process is clearly distinguished from previously known processes which are carried out without urea. For example in condensations of phenolic sulpho-acids and formaldehyde at the temperature of the water bath without urea, water insoluble and alkali insoluble resins are produced, whilst under the same conditions in the presence of urea tanning substances are obtained which are easily soluble in alkali.

Phenols have however been condensed with formaldehyde in the presence of urea, but with the help of very slight quantities of acid and thus solid artificial substances have been obtained which are completely insoluble in water and alkalies and are quite unsuitable for tanning purposes.

The new tanning substances in the form of their easily soluble salts in weak acid solution can be used to tan the animal skins to a vigorously worked and flexible or soft leather of light color which has hitherto been impossible with the artificial commercial tanning substances. They have the general reactions of the tanning substances: precipitation of albuminoids and gelatine, precipitation of basic dyestuffs, blue precipitation with iron chloride. Silk is charged by them under a considerable increase of weight. Leather produced with the substances according to the present invention, as distinct from that with known synthetic tanning substances, shows a remarkable fastness to light. The new substances can also be used profitably for combination tanning with other tanning or non-tanning substances.

In the actual preparing process instead of urea, urea yielding bodies, such as metal cyanamides, for instance calcium cyanamide, and formaldehyde substitutes can also be used. Moreover condensation products previously produced from formaldehyde and urea can also be condensed with phenolic sulpho-acids and formaldehyde.

The process is illustrated by the following examples, the parts being by weight.

Example I 20 parts of phenol or cresol and 20 parts of concentrated sulphuric acid are heated together for some time at 100–110° C. until the condensation product becomes satisfactorily water soluble. Then the mass is diluted with 15 parts of water, and after cooling to 25° C., 10 parts of urea are added and after a further 10 minutes 15 parts of formaldehyde of 30% strength are added rather quickly. Thereafter the solution is heated and well stirred for one hour at 80°–90° C. and is then subjected to neutralization with caustic soda lye until water solubility is reached on diluting. The viscous almost colorless mass after diluting with water can be forthwith used as tanning liquor and gives a snow-white completely tanned and soft leather. Addition of mineral acids to the tanning solution produces a white precipitate.

Example II 20 parts of powdered resorcin are mixed with 20 parts of concentrated sulphuric acid and heated to 80° C. until all the resorcin is dissolved. Then it is diluted with 15 parts of water and cooled down to 25° C. At this temperature 8 parts of urea are added and thereafter 14 parts of formaldehyde of 30% strength are added quickly. The temporarily resulting precipitate is speedily dissolved again entirely in the solution when the same is warmed up.

The mass is then again heated to 80–95° C. for an hour and is brought to a practically usable weakly acid reaction with caustic soda lye. The resulting viscous yellow mass can be thinned with water and used as tanning liquor.

Example III 100 parts of cresol and 100 parts of concentrated sulphuric acid are heated up to the point of water-solubility of the reaction product. Thereafter it is cooled down to 25° C. and whilst being well stirred is mixed with a solution obtained as follows: 200 parts of calcium cyanamide with 400 parts of water are boiled for 20 minutes, filtered, mixed with sulphuric acid, separated from the precipitated calcium sulphate and concentrated to 150 parts. On adding this solution filtered off from the precipitated calcium sulphate, the temperature of the condensation should not rise above 40° C. After 10 minutes, while stirring well, 60 parts of formaldehyde of 30% strength are added, and thereafter the temperature is again raised for 15 minutes to 80–95° C. The reaction product falls out insolubly but on addition of alkali lye passes again into solution. The free mineral acid is neutralized until complete water-solubility is attained, and if necessary is filtered off again from precipitated calcium sulphate. The product has very strong gelatine precipitating properties; by adding mineral acid a white precipitate falls out.

*Example IV*

10 parts of salicylic acid and 20 parts of concentrated sulphuric acid are heated to 120–130° C. until the reaction mass has become easily water-soluble. Thereupon after the addition of 10 parts of water it is cooled down to 40–50° C. To the precipitated thick crystalline pulp are added 5 parts of urea and 7 parts of formaldehyde of 30% strength, the mixture being then heated again for 30 minutes to 110–120° C. and subjected to neutralization with caustic soda lye until water-solubility is attained. The product is easily water-soluble and on adding a gelatine solution it falls out as a thick white precipitate.

*Example V*

20 parts of phenol or cresol are heated with 20 parts of sulphuric acid until water-solubility is reached. Then 2 parts of water are added and the mixture cooled down to 30° C. Thereupon 4.5 parts of formaldehyde of 30% strength are cautiously added drop by drop, the temperature not being allowed to rise during this above 30° C. When all the formaldehyde has been introduced, 8 parts of water are added and the powdered condensation product is added which is obtained from 10 parts of urea and 10.6 parts of formaldehyde with 2 parts of sulphuric acid (1:5 water). The temperature is then raised to 85–90° C. until with vigorous stirring the majority of the white condensation product, which is insoluble in most solvents, has passed into solution.

Finally it is subjected to neutralization in the usual way.

Instead of operating at elevated temperature, it will also be possible to work at ordinary temperature and with a correspondingly longer duration of reaction.

What I claim is:

1. A process for producing tanning substances, consisting in condensing the soluble reaction product of concentrated sulphuric acid with a phenolic body in the presence of urea in a sulphuric acid solution with formaldehyde and then neutralizing the solution.

2. A process for producing tanning substances, consisting in condensing the soluble reaction product of concentrated sulphuric acid with a phenolic body in the presence of urea, at a temperature of at least 30° C., in a sulphuric acid solution with formaldehyde and then neutralizing the solution.

3. A process for producing tanning substances, consisting in condensing the soluble reaction product of concentrated sulphuric acid with a phenolic body in the presence of urea obtained from an urea yielding substance in a sulphuric acid solution with formaldehyde and then neutralizing the solution.

4. A process for producing tanning substances, consisting in condensing the soluble reaction product of concentrated sulphuric acid with a phenolic body in the presence of urea obtained from an urea yielding substance, at a temperature of at least 30° C., in sulphuric acid solution with formaldehyde and then neutralizing the solution.

5. A process for producing tanning substances, consisting in condensing the soluble reaction product of concentrated sulphuric acid with cresol in the presence of urea in a sulphuric acid solution with formaldehyde and then neutralizing the solution.

6. A process for producing tanning substances, consisting in condensing the soluble reaction product of concentrated sulphuric acid with cresol in the presence of urea, at a temperature of at least 30° C., in a sulphuric acid solution with formaldehyde and then neutralizing the solution.

7. A process for producing tanning substances, consisting in condensing the soluble reaction product of concentrated sulphuric acid with a phenolic body in a sulphuric acid solution with formaldehyde in the presence of a condensation product of urea and formaldehyde and then neutralizing the solution.

8. As new products of manufacture the tanning substances obtained by condensation of the soluble reaction products of concentrated sulphuric acid with a phenolic body in the presence of urea in a sulphuric acid solution with formaldehyde and subsequent neutralization of the solution, said products giving a white precipitation with mineral acid and showing the characteristics of the precipitation of basic dyestuffs, of the precipitation of albuminoids and gelatine, and of a blue precipitation with iron chloride.

In witness whereof I have hereunto signed my name this 29th day of December, 1928.

PAUL MÜLLER.